May 15, 1923.
P. M. FLACK
1,455,581
AUTOMOBILE DIRECTION INDICATOR
Original Filed March 25, 1920  2 Sheets-Sheet 1
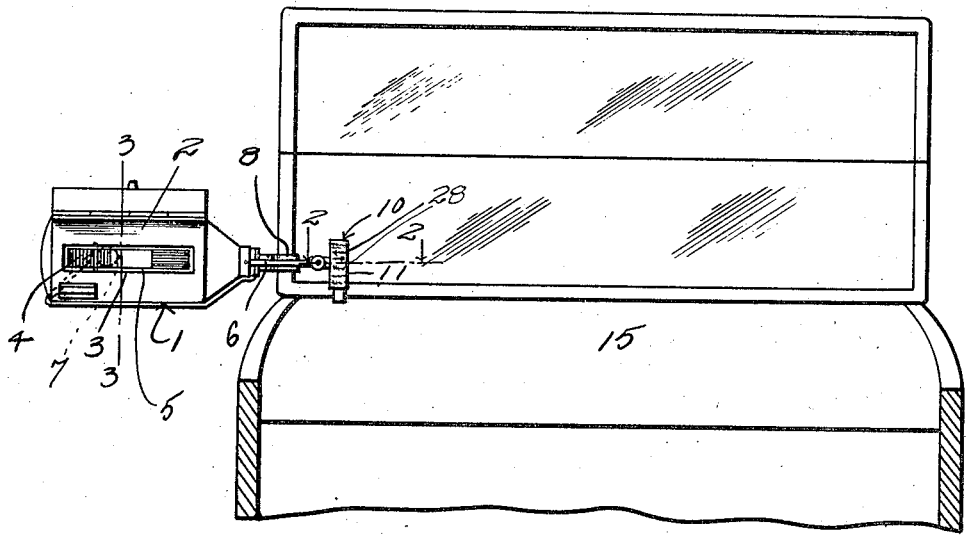
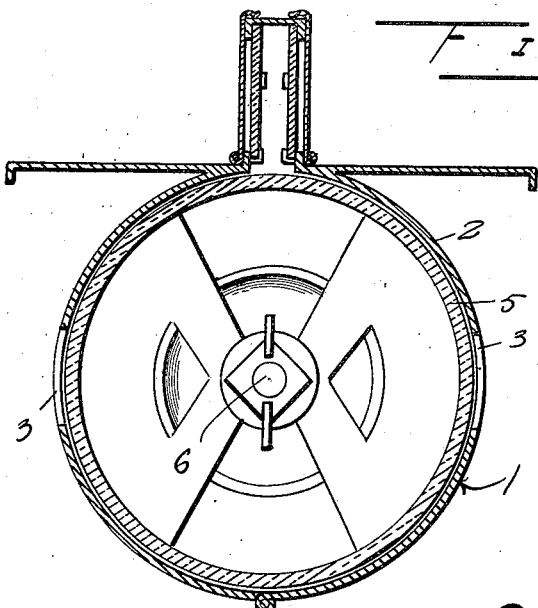
Inventor
P.M.Flack
By Randolph, Atty.

May 15, 1923.
P. M. FLACK
1,455,581
AUTOMOBILE DIRECTION INDICATOR
Original Filed March 25, 1920    2 Sheets-Sheet 2
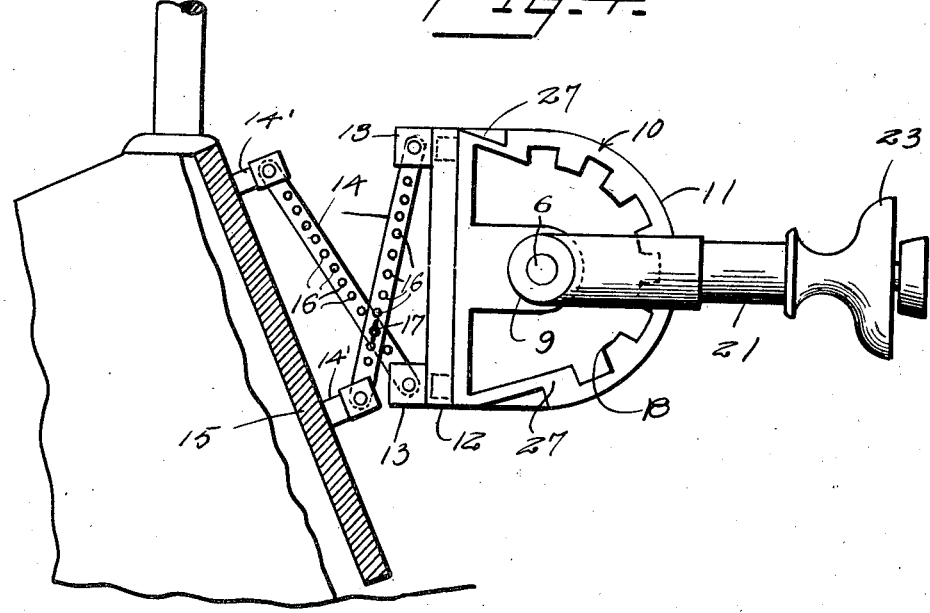
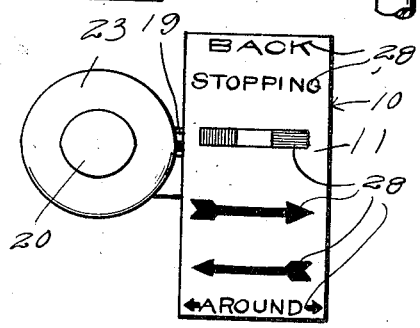
Inventor
P.M.Flack
By Patented May 15, 1923.

1,455,581

UNITED STATES PATENT OFFICE.

PAUL M. FLACK, OF OGDENSBURG, NEW YORK.

AUTOMOBILE DIRECTION INDICATOR.

Original application filed March 25, 1920, Serial No. 368,573. Divided and this application filed June 17, 1921. Serial No. 478,350.

*To all whom it may concern:*

Be it known that I, PAUL M. FLACK, a citizen of the United States, residing at Ogdensburg, in the county of St. Lawrence and State of New York, have invented certain new and useful Improvements in Automobile Direction Indicators; and I do hereby declare the following to be a full, clear, and exact description of the invention, such as will enable others skilled in the art to which it appertains to make and use the same.

This invention relates to new and useful improvements in automobile direction indicators, and has for its primary object the provision of a control means whereby any one of the characters of the signal may be moved and held in view through the sight openings of the casing and which control means is equipped with corresponding characters with those in the casing, so that the operator by the controlling means may readily select a character to be displayed.

Another object of this invention is the provision of an automobile direction indicator of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a view illustrating my invention applied to a fragmentary portion of an automobile, Figure 2 is a horizontal sectional view taken on the line 2—2 of Figure 1, Figure 3 is a transverse sectional view taken on the line 3—3 of Figure 1, Figure 4 is an enlarged detail view illustrating the manner of mounting the controlling means on the instrument board of the automobile, Figure 5 is a detail view illustrating the scale board.

Referring in detail to the drawings, the numeral 1 indicates a signal forming subject matter of my application hereinbefore mentioned and consists of a casing 2 having front and rear sight openings 3 through which various characters 4 are adapted to appear and which are carried by a drum 5 mounted on a shaft 6. The shaft 6 is journaled in the casing 2. The drum 5 is preferably constructed of glass or some other transparent material suitable for the purpose and has opaque characters arranged thereon. The drum 5 is adapted to be illuminated by a suitable illuminating means 7 arranged therein. A suitable clamp 8 is carried by the casing 2 and is adapted to grip the automobile for supporting the casing at right angles thereto. The inner end of the shaft 6 is journaled in a bearing 9 forming a part of the operating means 10 which includes a substantially semi-circular board 11 secured to a base 12. The base 12 has formed thereon lugs 13 to which are pivoted arms 14. The other ends of the arms 14 are pivotally connected to attaching brackets 14' which are secured in any desired manner to the instrument board 15 of the automobile. The arms 14 are arranged in pairs and cross each other as clearly shown in the drawings and are provided with a series of openings 16 any of which are adapted to aline for receiving set bolts 17 whereby the angle of the base 12 may be varied in respect to the instrument board 15 and also provides means whereby the base 12 may be disposed vertically while the automobile is equipped with an inclined instrument board.

One end of the board 11 has formed thereon inwardly directed spaced teeth 18 to be engaged by a dog or pawl 19 secured to the inner end of a plunger 20 which is carried by a controlling lever 21. The controlling lever 21 is secured to the shaft 6 adjacent the drum and is provided with a slot 22 to permit movement of the dog 19 by the plunger. A finger grip 23 is carried by the controlling lever 21 and is constructed from rubber or any other material suitable for the purpose and has located therein a bushing 24 which slidably supports the plunger 20. An expansion spring 25 surrounds the plunger and bears against the bushing and a spider 26 formed in the controlling lever for normally urging the dog or pawl 19 into engagement with the teeth of the board. At each end of the series of teeth is formed a stop 27 adapted to limit the movement of the controlling lever and the face of the board has painted or otherwise applied thereon characters 28 corresponding to the characters carried by the drum in the casing 2, so that by moving the controlling lever 21 in alinement with a certain character on the board, the corresponding character will appear in view through the sight openings of the casing 2.

What is claimed is:—

1. A direction indicator comprising a base, a shaft carried by said base for operating an indicator having direction characters, a semi-cylindrical vertically arranged scale board secured to said base, a controlling lever secured to the shaft and associated with the scale board, and means to positively lock said controlling lever in alignment with any one of the characters on the scale board.

2. A direction indicator comprising a base, means permitting adjustment of said base relative to the object on which the base is mounted, a shaft carried by said base for operating an indicator having direction characters thereon, a vertically positioned scale board carried by said base, characters on said scale board to correspond with the characters on the indicator, a control lever connected with the shaft and associated with the scale board, and means to lock said lever in alignment with any of the characters on the scale board.

3. A direction indicator comprising a base, a shaft carried by said base for operating an indicator having direction characters thereon, a scale board carried by said base, characters on said scale board to correspond with the characters of the indicator, means associated with the characters on the scale board whereby an operating lever having connection with the shaft may be fastened in alignment with any of the indicating characters on the scale board, and stops formed above and below the indicating characters of the scale board whereby to limit the movement of the operating arm.

In testimony whereof I affix my signature in presence of two witnesses.

PAUL M. FLACK.

Witnesses:
 DANIEL O. McROSTER,
 JOHM M. BARR.